Sept. 16, 1958      H. B. WOLF      2,851,992

BROODER AND HEATING UNIT THEREFOR

Filed Sept. 5, 1956      2 Sheets-Sheet 1

INVENTOR:
HERMAN B. WOLF.

BY Eaton, Bell, Hunt & Seltzer

ATTORNEYS

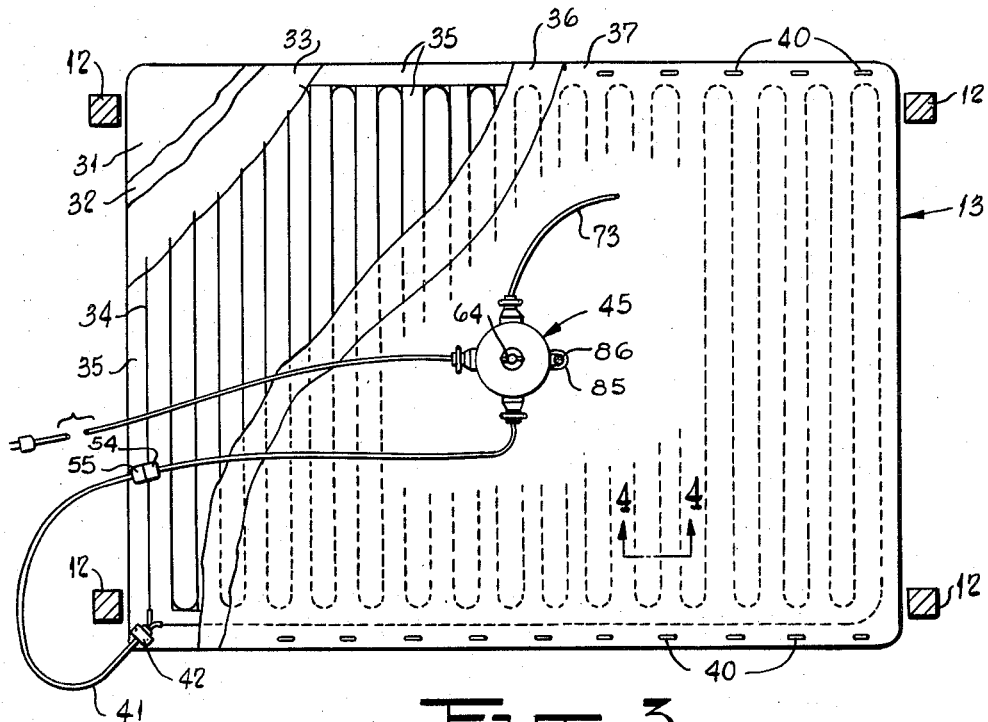
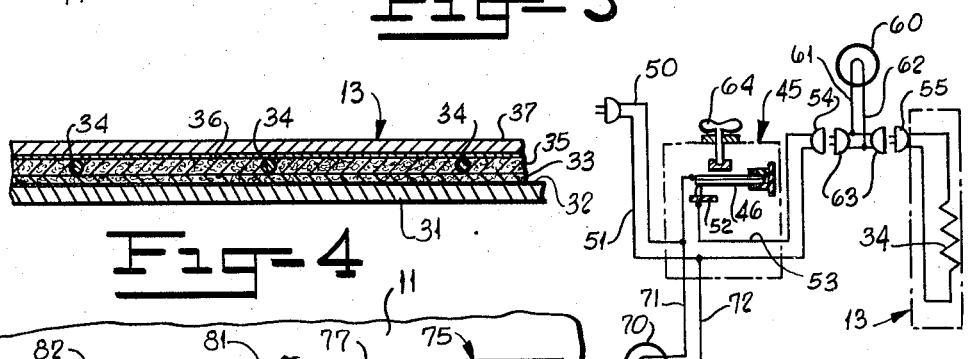
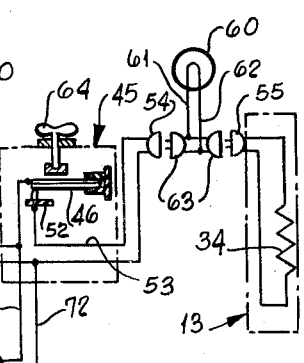
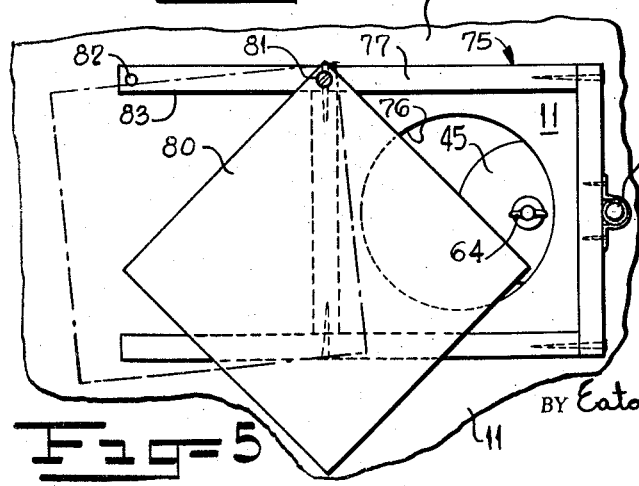

United States Patent Office 2,851,992
Patented Sept. 16, 1958

2,851,992

BROODER AND HEATING UNIT THEREFOR

Herman B. Wolf, Charlotte, N. C., assignor to Radiant Products, Inc., Monroe, N. C., a corporation of North Carolina Application September 5, 1956, Serial No. 608,039

4 Claims. (Cl. 119—33)

This invention relates to brooders for fowl such as baby chicks, turkeys and the like, and more particularly to a brooder constructed and heated in such a manner as to minimize the amount of heat energy required to maintain a desirable and uniform temperature throughout the interior of the brooder.

Brooders heretofore known in the art have utilized heating units centrally disposed within the confines of the brooder, and in some instances the heating unit has been in the form of an electric heater suspended from the top of the brooder. In other instances, a gas burner has been disposed in the center of the brooder for radiating heat throughout the brooder. In an effort to more evenly dissipate the heat throughout the brooder, fans have been previously associated with both the electric heating unit and the gas burner for circulating the heat throughout the brooder.

All of these prior devices have proven objectionable in that it was necessary to generate more heat at the source than was actually required in an effort to maintain the fringe areas of the brooder at the desired temperature. The necessary consequence of such an arrangement is that prior brooders have had hot spots and cold spots rather than a uniform temperature throughout, and the fowl, attempting to avoid the cold spots, have frequently smothered one another in their attempts to congregate about the hot spots for warmth.

Another objection to brooders heretofore known in the art is that the floors of such brooders have been the coldest and wettest spot in the brooder. This feature is particularly objectionable because the droppings of the baby fowl are preserved on the cold and wet floor with the result that the baby fowl peck at the doppings and become sick and often die.

It is therefore an object of this invention to provide a brooder and a heating unit therefor which can be maintained at a uniform temperature without any hot spots or cold spots, thereby eliminating the necessity of the baby fowl to congregate for warmth and consequently lessening the likelihood of the fowl smothering one another.

It is another object of this invention to provide a brooder wherein means are provided for keeping the floor warm and dry and preventing the accumulation of droppings from the fowl.

It has long been recognized that the maintenance of a proper temperature is critical to the development of baby fowl and it is therefore another object of this invention to provide a thermostatically controlled heating unit for brooders whereby the temperature within the brooder may be automatically maintained within the desired range.

Another object of the invention is to provide a simplified means for adjusting the setting of the thermostat to insure that it will be responsive to predetermined variations in the temperature within the brooder to actuate the heating unit thereby stabilizing the temperature within the brooder within the ranges found to be critical in the raising of baby fowl.

Still another object of the invention is to provide a brooder which incorporates all of the foregoing advantages and is simple to manufacture, easy to install, and economical to operate.

Some of the objects of the invention having been stated, other objects will appear as the description proceeds when taken in connection with the accompanying drawings, in which—

Figure 3 is an enlarged sectional plan view taken substantially along the line 3—3 in Figure 2 and showing the construction of the heating unit with parts broken away for purposes of clarity;

Figure 4 is an enlarged vertical sectional fragmentary view taken substantially along the line 4—4 in Figure 3 and further illustrating the construction of the heating unit;

Figure 5 is a detail plan view taken substantially along the line 5—5 in Figure 1 and showing the ventilator in the canopy of the brooder in partially open position and showing in dotted lines the position the ventilator closure assumes when fully open;

Figure 6 is a schematic wiring diagram illustrating the manner in which the electrically operable heating unit and pilot lamp are connected to the thermostat and also showing the manner in which the thermostat adjusting lamp is interposed in the circuit when adjusting the thermostat.

Figure 1:
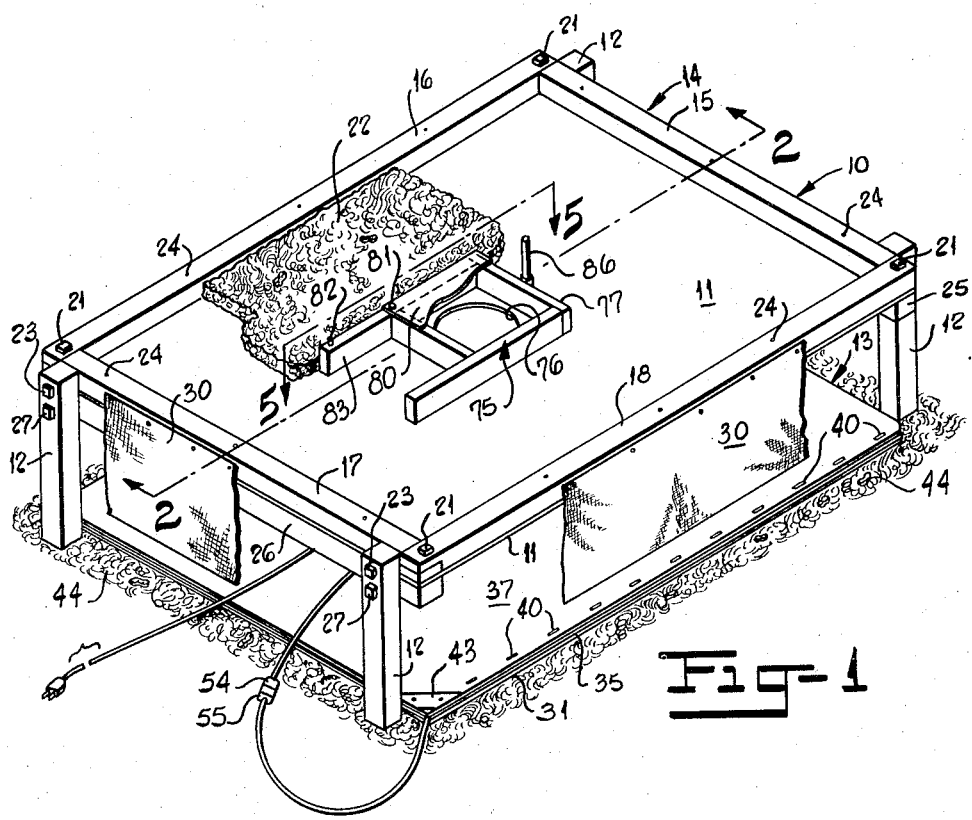
Figure 1 is an isometric view looking down at the top of the brooder and omitting a portion of the insulating litter on the top of the brooder and also omitting portions of the curtain extending about the sides of the brooder for purposes of clarity.
Figure 2:
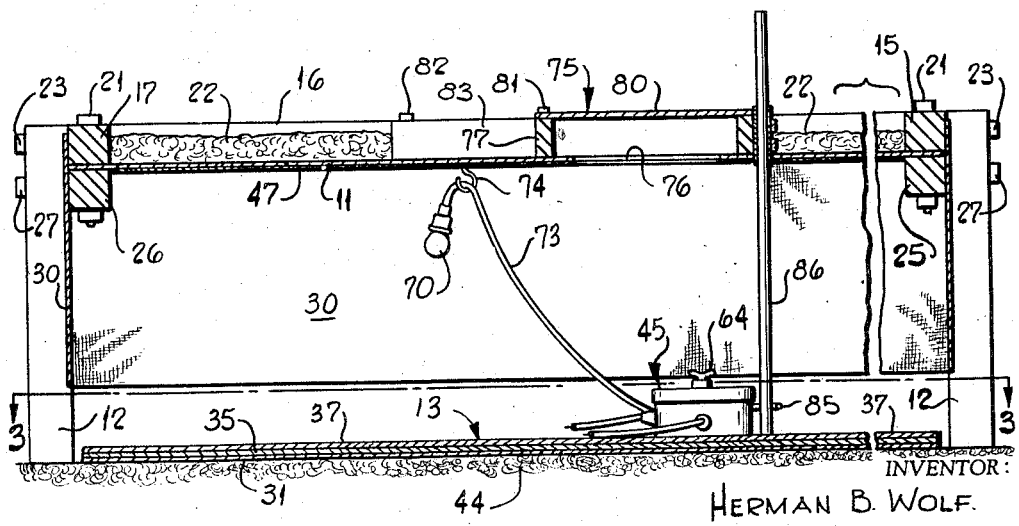
Figure 2 is a transverse vertical sectional view taken substantially along the line 2—2 in Figure 1 with parts broken away.

Referring more specifically to the drawings, the numeral 10 broadly designates a canopy or upright housing which includes a top or top wall 11 for the brooder supported by a plurality of legs 12. The top 11 is of flat planar configuration and may be formed of any suitable material such as hardboard, plywood or sheet metal. The legs 12 are of sufficient length to support the top 11 a suitable distance above a heating unit or pad, broadly indicated at 13, which serves as a floor for the brooder and is positioned beneath the top 11 with the legs 12 astraddle and spaced from opposite ends of the pad or floor 13, as most clearly seen in Figures 2 and 3.

The canopy 10 also includes an upstanding peripheral border or rim 14 which may comprise wooden framing members 15, 16, 17 and 18 joined together at their ends by any suitable means such as bolts 21. The rim 14 extends upwardly above the top 11 a sufficient distance to serve as a retaining means for a heat insulating medium 22 disposed on the upper surface of the top 11, said insulating medium 22 extending across the top 11 between the framing members which define the rim 14. The insulating medium 22 may consist of any suitable heat insulating substance such as asbestos. It has been found that litter in the form of small wood shavings or sawdust not only serves as suitable insulation but is also advantageous in that it provides an additional play area for the fowl when they become large enough to jump on the canopy. The overall height of the brooder need be only sufficient to adequately house the fowl.

The legs 12 and rim 14 are shown in the drawings as being formed of wood and secured together as by bolts 23 with the top 11 being fixed to the undersurface of the framing members 15, 16, 17 and 18 by suitable fastening means such as nails or screws 24. If desired, however, the legs 12 and/or the rim 14 may be formed of metal, as well as the top 11, and the entire canopy suitably fixed together by any desired means.

In addition to the nails or screws 24 the top 11 may be additionally supported at opposite ends, as shown in the drawings, by support members 25 and 26 disposed beneath the framing members 15 and 17, respectively, so that the corresponding end portions of the top 11 are sandwiched between the framing member 15 and the support member 25 at one end and between the framing member 17 and support member 26 at the other end. The support members 25 and 26 may be attached to their corresponding legs 12 as by bolts 27.

The canopy 10 also includes a curtain 30 preferably formed of pliable material such as canvas and extending about the rim 14 and suitably secured thereto as by tacks 31 or any other suitable means such as adhesive or clips. The lower edge of the curtain 30 is spaced above the floor or pad 13 a sufficient distance to permit the baby fowl to have free ingress and egress into and out of the brooder.

The heating unit for the brooder is housed within the pad 13 which is constructed in such a manner as to uniformly heat the entire upper surface of the pad 13, which in turn uniformly radiates heat throughout the brooder. The pad 13 is of laminated multi-ply construction and includes a lower ply or panel 31 of water-proof sheet material such as hardboard or metal. If the lower panel 31 is formed of hardboard it is desirable to provide the upper or inner surface of the sheet or panel 31 with a reflecting film of aluminum 32 which may be in the form of aluminum paint.

The next ply or layer of the multi-ply pad 13 comprises a sheet of asphalt saturated felt 33 which serves as a convenient cushion for a plurality of parallel runs of insulated resistance heater wire 34 disposed on the upper or inner surface of the asphalt saturated felt sheet 33. The extremities of the runs of wire 34 are spaced inwardly from the corresponding edges of the sheet of saturated felt 33 and relatively thick strips of asphalt saturated felt 35 are tightly wedged between the runs of the wire 34 and between the edges of the shaft 33 and the extremities of the runs of wire 34.

In addition to serving as retaining means for preventing displacement of the heater wire 34, the asphalt saturated felt 33 and 35 is an excellent conductor of heat and readily transfers a portion of the heat from the wire 34 to a sheet of aluminum foil 36 positioned above the wire 34 and felt 35. As most clearly seen in Figure 4, the sheet of aluminum foil 36 is disposed in direct contact with the insulated resistance heater wire 34 and with the strips of relatively thick asphalt saturated felt 35.

The next and top layer or ply of the pad 13 comprises a second sheet of rigid water-proof fibrous sheet material such as hardboard 37 which may be identical to the lower panel 31.

The entire inner assembly is coated with asphalt cement, not shown, the asphalt cement being coated on each ply of the pad as the pad is formed. The asphalt cement is preferably of a type that not only possesses excellent adhesive and waterproofing qualities, but also is a good conductor of heat. The assembled pad is pressed under sufficient pressure of approximately one hundred pounds per square foot to form a compact unit, after which the edges of the pad 13 may be coated with asphalt cement to further render the entire pad water-proof. To further assist in preventing parting of the assembly, the edges are preferably stapled at intervals with suitable staples 40.

During the assembly of the pad, an attachment or lead-in line or cord 41 is fixed to the insulated resistance heater wire 34 and a strain relief clamp 42 is utilized to fasten the lead-in line 41 to the lower ply 31 of the pad 13. After the pad 13 is assembled in the manner heretofore described an additional strain relief clamp or plate 43 is fixed to the outer surface of the upper ply 37 in superposed relation to the strain relief clamp 42, the plate 43 being fastened to the pad 13 by rivets which extend therethrough to prevent separation of the corner from which the lead-in line 41 extends.

The aluminum coating 32 on the upper or inner surface of the lower ply 31 reflects the heat generated by the wire 34 toward the upper portion of the pad 13. The aluminum foil 36 disposed between and in direct contact with the upper ply 37 on one side and the insulated heater resistance wire 34 and the strips of asphalt saturated felt 35 on the other side is an excellent conductor of heat and the heat generated by the wire 34 is therefore uniformly transferred to all portions of the upper ply 37 through the aluminum foil 36 by conduction.

Thus, the pad assembly as described provides a path for the flow of heat from the heater wire 34 to the upper surface of the pad 13 which results in uniform heating of the upper surface and a very low temperature gradient between the heater wire 34 and the upper surface of the upper panel 27. This permits the heater wire to operate at a comparatively low temperature with resulting slow deterioration and long life.

To further aid in directing the heat generated by the heater wire 34 upwardly within the brooder, the pad 13 is preferably positioned on top of suitable insulation which may be in the form of litter comprising sawdust, wood shavings and the like. It has been found that a layer of litter such as indicated in the drawings at 44 of a depth of approximately two inches is sufficient to cause the great bulk of the heat generated by the heater wire 34 to pass upwardly through the upper ply 37 of the pad 13 and into the broder. In order to further aid in the uniform distribution of heat throughout the brooder, the inner or lower surface of the top 11 is preferably coated with a heat reflecting material such as aluminum paint 47. Thus, the heat generated by the pad 13, which has a tendency to rise, is reflected downwardly to conserve the heat and afford uniform warmth for the baby fowl.

It has been heretofore noted that the sheet of hardboard 37 defines the upper surface of the pad 13, and the sheet 37 is preferably so arranged as to present a smooth unbroken surface as a floor for the brooder. This is the surface from which the heat generated by the pad 13 radiates throughout the brooder, and is also the surface which supports the fowl.

It has been found that by leaving the floor uncovered and allowing the droppings of the fowl to fall directly on the smooth warm surface of the pad 13, the droppings are quickly solidified by the warmth of the pad and readily disposed of by the scratching action of the fowl as they walk over the smooth surface of the pad. This is advantageous in that it prevents the accumulation of moist cold droppings and likewise precludes any tendency of the fowl to peck at their droppings and become sick as a result. It is also advantageous in that the pad or floor 13 is sufficiently self-cleaning that it need only be swept clean between broods. Thus, it is no longer necessary to constantly clean the floor of the brooder which has heretofore been necessary.

It is well known in the art that the temperature of the brooder is critical to the proper raising of fowl and it has been found, for example, that a temperature between ninety-six and ninety-eight degrees Fahrenheit is a suitable temperature for baby chicks. In order to insure that the surface temperature of the pad 13 is maintained within this or any other desired range there is preferably provided a thermostat broadly indicated at 45 and containing a bi-metallic heat responsive element 46 (Figure 6). The thermostat 45 is disposed on the upper surface of the pad 13 with the bimetallic element 46 in the lower portion of the thermostat housing in order to control the temperature of the pad 13 as accurately as possible.

The thermostat 45 is connected to a source of electrical energy by a lead-in-line including a pair of wires 50 and 51. The bimetallic element 46 within the thermostat 45 is connected to the wire 50 and is adapted to engage a contact 52 upon the termperature in the pad 13 dropping to a predetermined point. The contact 52 is, in turn, connected to a wire 53 which, together with the wire 51, extends to a socket 54. The socket 54 is adapted for attachment with a mating socket 55 connected to the line 41 which extends into the heating pad 13.

The bimetallic element 46 is responsive to the surface heat of the pad 13 and is adapted to move away from the contact 52 upon the surface temperature reaching a predetermined point of, for example, ninety-eight degrees. When the bimetallic element 46 moves away from the contact 52 it is clear that this breaks the circuit to the pad and thereby shuts off the flow of electrical energy thereto. Upon the surface temperature of the pad cooling to a predetermined point of, for example, ninety-six degrees, the bimetallic element 46 will again move into engagement with the contact 52 to complete the circuit to the pad thereby activating the pad to elevate the temperature within the brooder.

In view of the necessity of maintaining the critical temperature it has been found advisable to check the surface temperature of the pad several times within the first few hours after the baby fowl have been placed thereon. In order to facilitate checking of the temperature it has been found advisable to provide a tell-tale device which may be in the form of audible or visual means for determining the actual temperature at which the pad is actuated by the thermostat. The tell-tale device may comprise a thermostat adjusting lamp 60 connected by a pair of wires 61 and 62 to a socket 63 which, in turn, may be selectively interposed between the sockets 54 and 55 when it is desired to check the sensitivity of the thermostat 45 and the resulting actuation of the pad 13.

The thermostat adjusting lamp 60 is used in conjunction with a thermometer laid on the surface of the pad 13, and an adjustment knob 64 on the thermostat 45 may be manipulated as required to regulate the thermostat. It is, of course, obvious that the adjusting lamp 60 will be energized simultaneously with the pad 13 upon the bimetallic element 46 engaging the contact 52 to complete the circuit to the pad 13 and the thermostat adjusting lamp 60. Conversely, when the circuit is broken by movement of the bimetallic element 46 away from the contact 52 the thermostat adjusting lamp 60, along with the pad 13, is de-energized.

In the initial actuation of the brooder, before placing baby fowl therein, the adjustment knob 64 on the thermostat 45 should be manipulated to allow the pad 13 to obtain the maximum heat, and the thermostat adjustment lamp 60 should be interposed in the circuit during preheating and allowed to burn continuously during this time. By placing a thermometer on the surface of the pad 13 it can be readily determined when the surface temperature of the pad reaches the desired point of, for example, ninety-eight degrees. At this point, the adjustment knob 64 may be manipulated to cause the bimetallic element 46 to move away from the contact 52 thereby breaking the circuit and de-energizing the thermostat adjusting lamp 60 and the pad 13. By watching the thermostat adjusting lamp and the thermometer on the surface of the pad 13 it can be readily determined whether the thermostat actuates the pad upon the surface temperature of the pad falling to a predetermined minimum of, for example, ninety-six degrees. If the lamp is not actuated appropriate adjustment of the thermostat may be made.

The thermostat adjusting lamp 60 is also useful in changing the setting of the thermostat from time to time as the baby fowl within the brooder grow older and thus require less heat. A reduction in temperature of approximately five degrees per week is often used in the raising of baby chicks.

A pilot lamp 70 is connected by wires 71 and 72 to the wires 50 and 51, respectively, within the housing of the thermostat 45. The wires 71 and 72 are included in the line or cord 73 by which the pilot lamp 70 is suspended from the top 11 of the brooder as by a hook 74. As noted in the wiring diagram shown in Figure 6, the pilot lamp burns continuously and is not controlled by the thermostat 45.

In order to provide fresh air within the brooder, a ventilator, broadly indicated at 75 is provided in the top 11 of the brooder. The ventilator 75 includes an opening 76 in the top 11 about which extends a raised barrier, rim, or guard 77 of the same height as the rim 14 which extends about the periphery of the brooder. The purpose of the guard 77 is to prevent the litter or other insulating medium 22 from clogging the opening 76. The opening 76 is closable by a cover 80 pivoted to the guard 77 as at 81, and if desired a suitable stop member 82 may be provided on an extension 83 of the guard 77.

As shown in the drawings, the ventilator 75 is preferably positioned directly above the thermostat 45 and is preferably of sufficient size to permit one's hand to be passed therethrough to facilitate manipulation of the thermostat adjusting knob 64. Depending on the size of the brooder, it may be desirable to provide additional similar ventilators of varying suitable dimensions in the top 11.

The housing of the thermostat 45 is provided with a ring 85 adapted to be penetrated by a dowel pin or post 86 which also penetrates the guard 77 and serves as an anchor for the thermostat 45. Thus, the thermostat may be kept in position on the pad 13 and not dislodged by the fowl.

There is thus provided an improved brooder for fowl which incorporates novel features for maintaining a constant and uniform temperature throughout the brooder with a maximum of efficiency in operation and performance.

In the drawings and specification there has been set forth a preferred embodiment of the invention and, although specific terms are employed, they are used in a generic and descriptive sense only and not for purposes of limitation, the scope of the invention being defined in the claims.

I claim:

1. A brooder for baby fowl comprising a frame, said frame having mounted thereon a substantially flat roof, said roof including insulating material and a heat reflecting lower surface, supporting means connected to said roof, peripheral side members depending from said roof and having lower edges, and a floor having therein throughout substantially its entire area radiant heating means, said floor being spaced below the lower edges of said peripheral side members.

2. A structure according to claim 1 wherein a ventilator is provided in the roof.

3. A structure according to claim 2 wherein closure means are provided for the ventilator.

4. A structure according to claim 1 wherein said radiant heating means is electrically energized.

References Cited in the file of this patent

UNITED STATES PATENTS

| 2,358,938 | Murray | Sept. 26, 1944 |
| 2,493,589 | McCaskell | Jan. 3, 1950 |
| 2,710,592 | Thomas et al. | June 14, 1955 |

FOREIGN PATENTS

| 618,893 | Great Britain | Mar. 1, 1949 |

OTHER REFERENCES

Warner Premier Electric Brooder, The National Ideal Company publication, 1937.